United States Patent Office 2,828,507
Patented Apr. 1, 1958

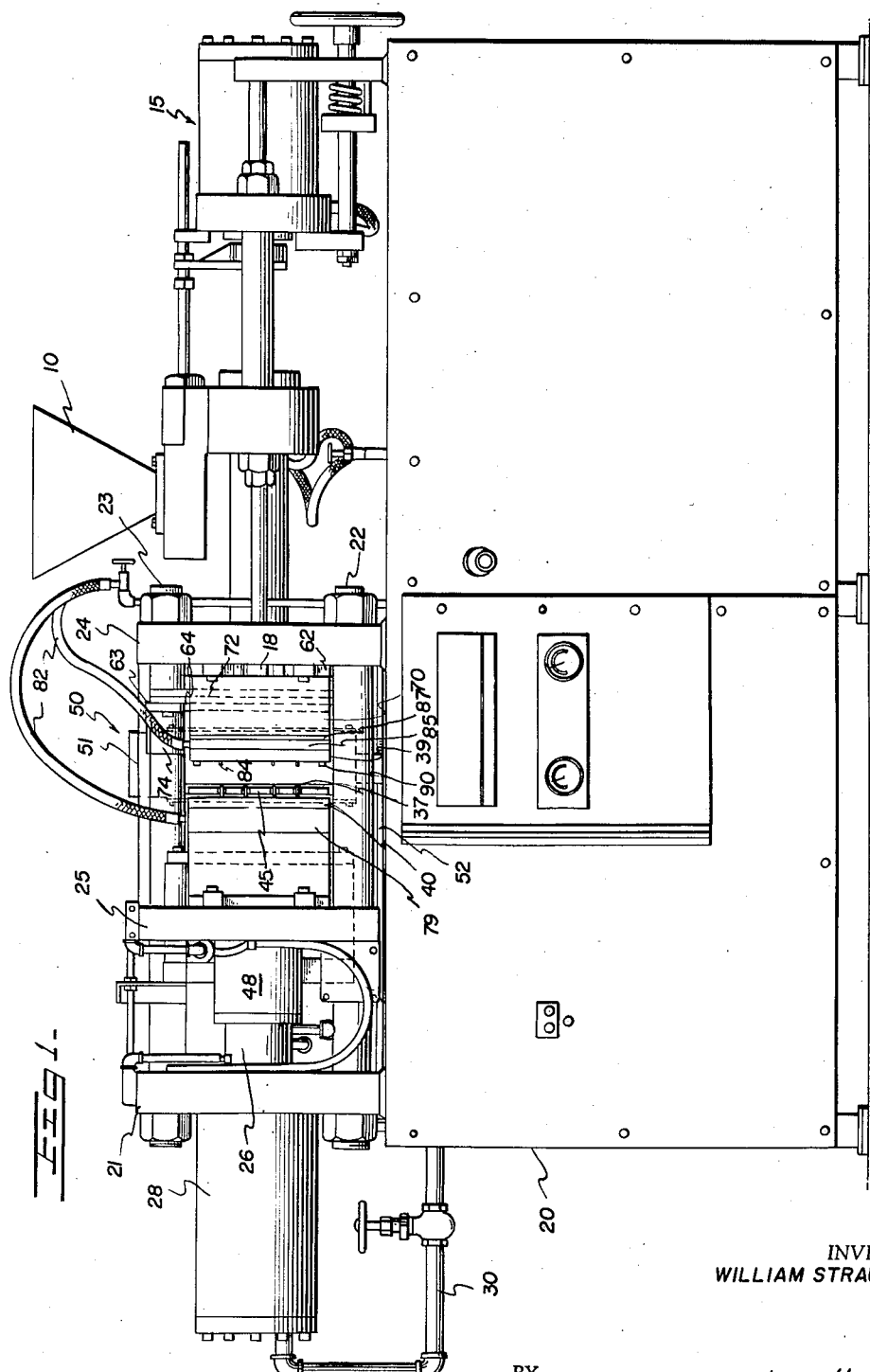

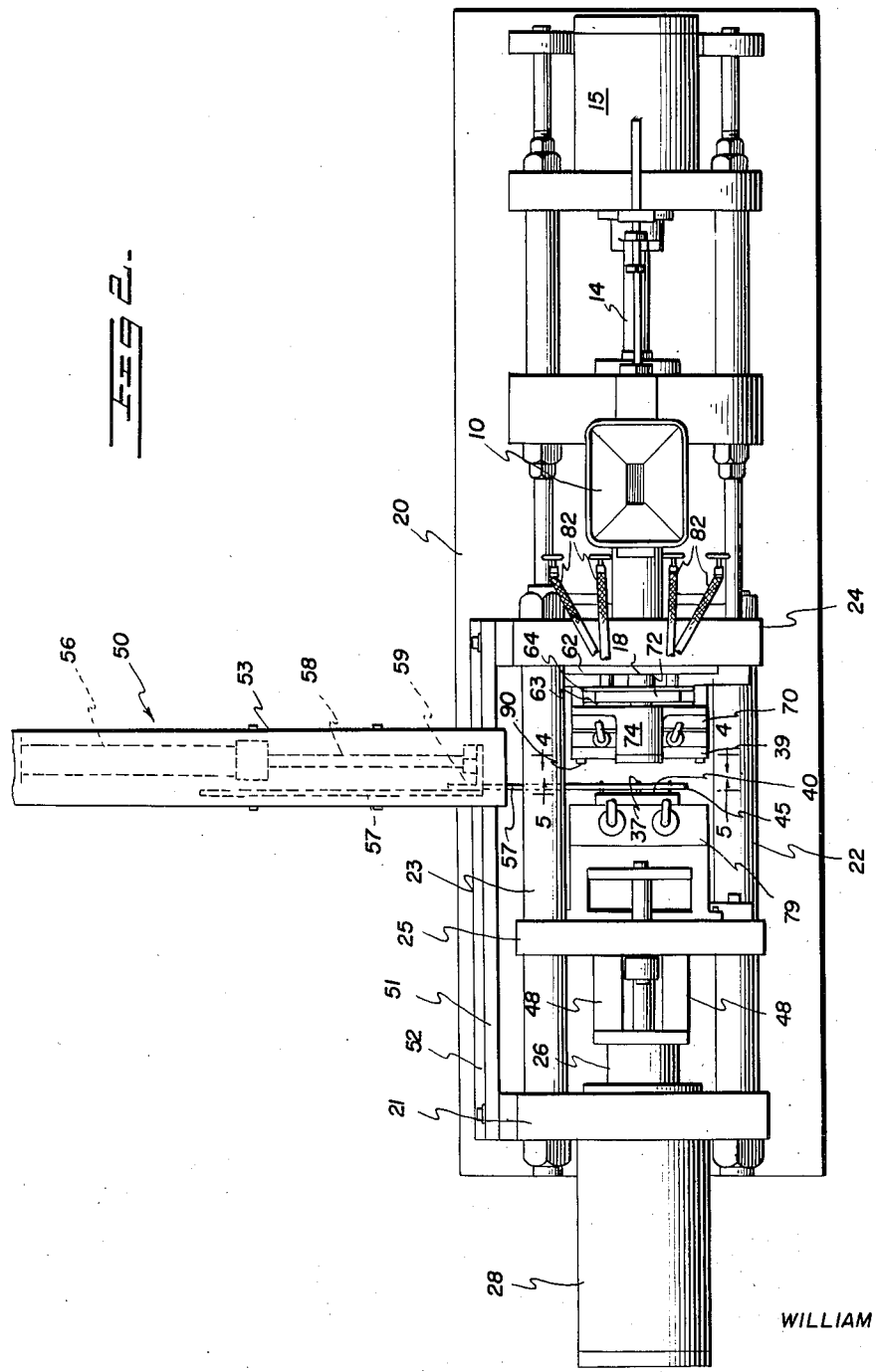

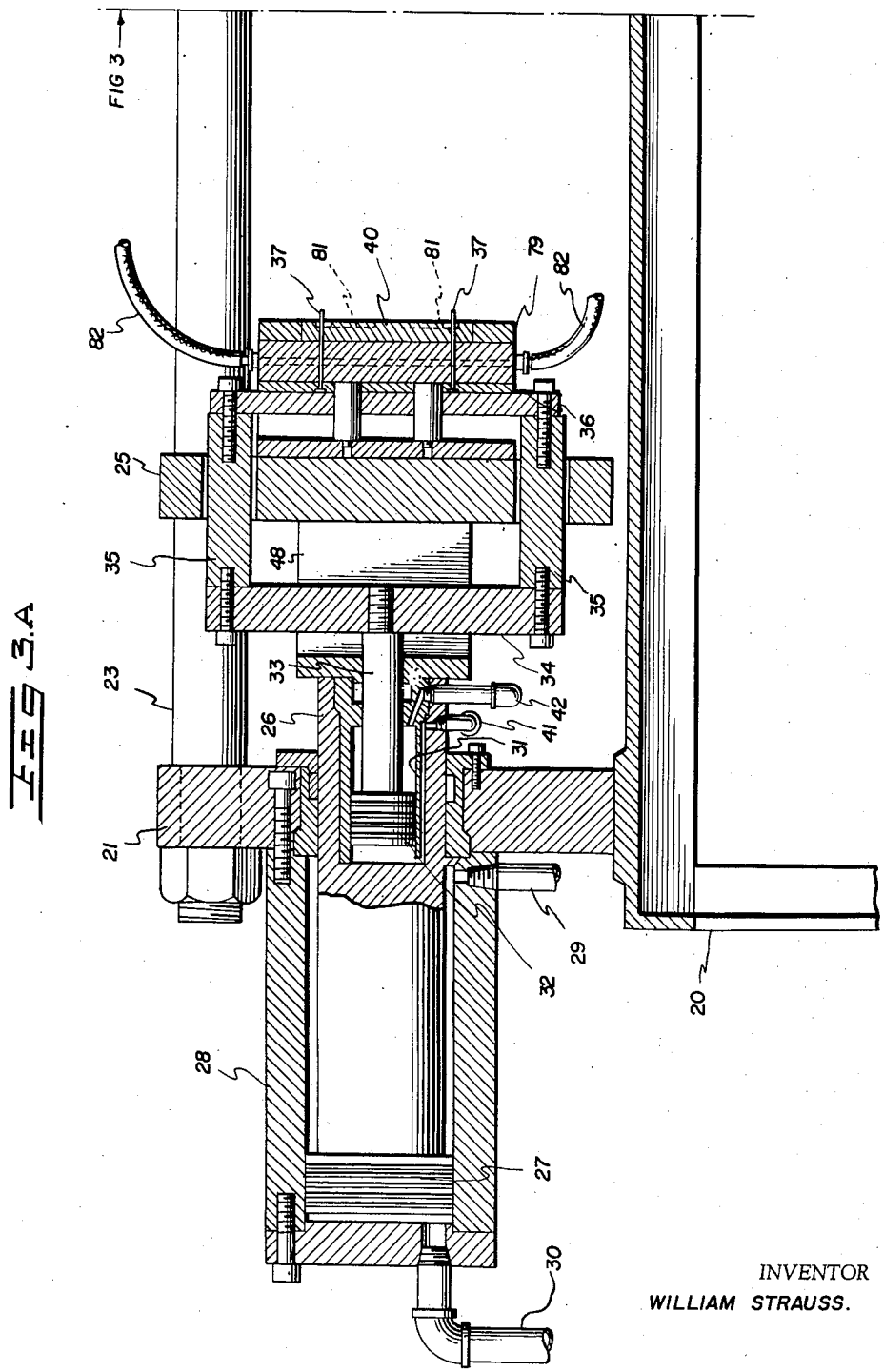

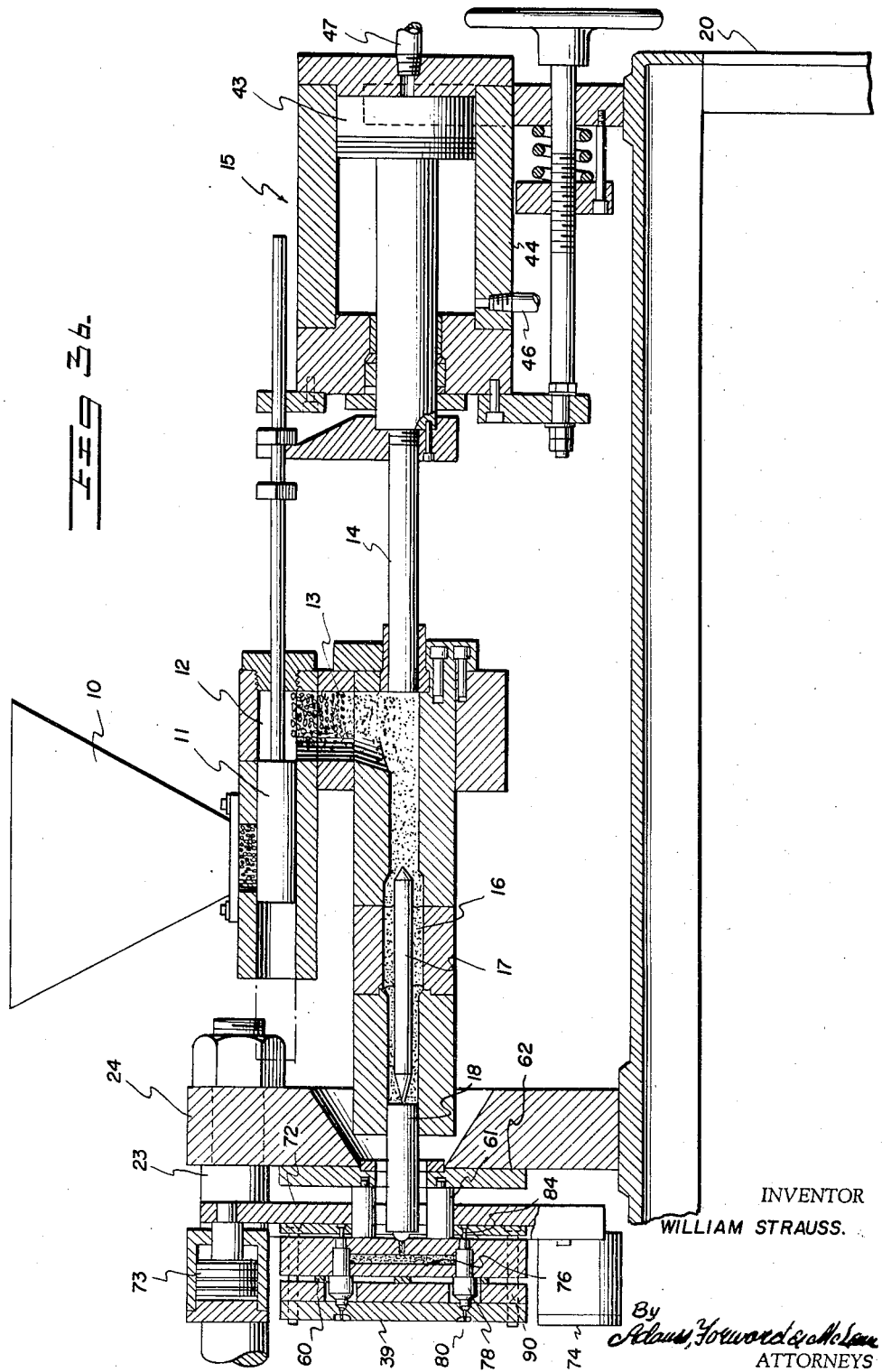

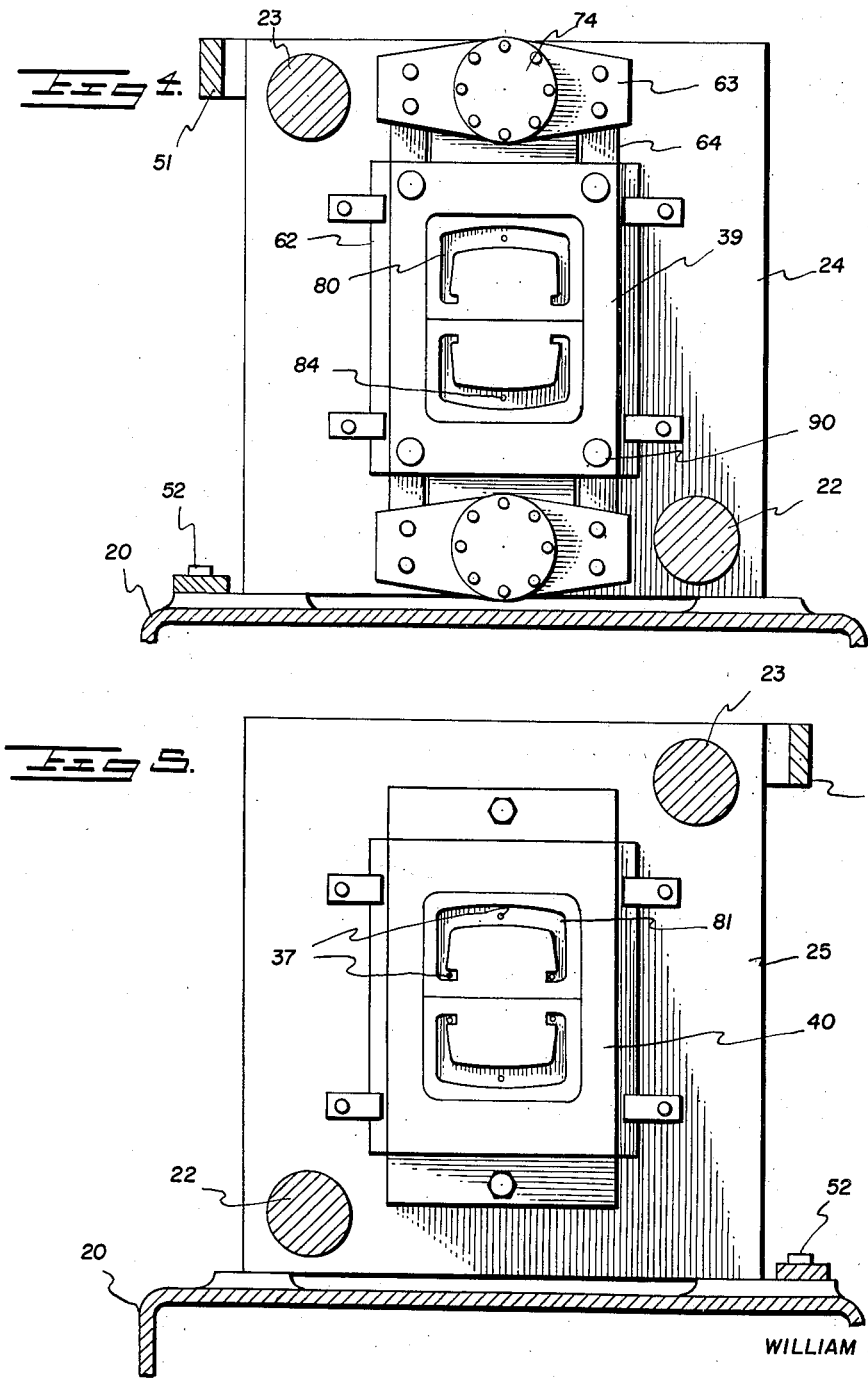

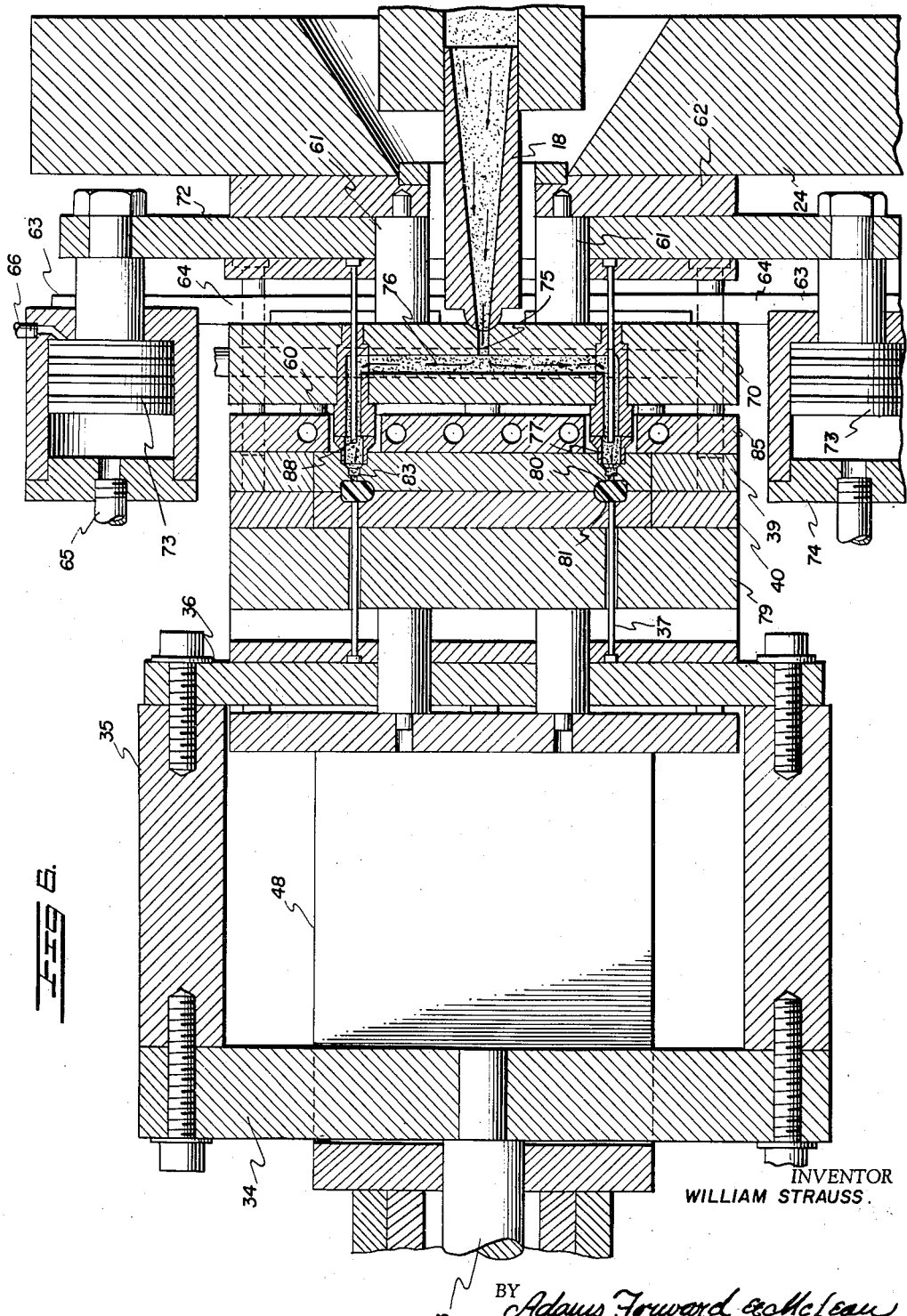
April 1, 1958 — W. STRAUSS — 2,828,507
INJECTION MOLDING PRESS HAVING VALVED GATE
Filed Dec. 7, 1953 — 8 Sheets-Sheet 6
INVENTOR
WILLIAM STRAUSS.
BY Adams, Forward & McLean
ATTORNEYS April 1, 1958  W. STRAUSS  2,828,507
INJECTION MOLDING PRESS HAVING VALVED GATE
Filed Dec. 7, 1953                              8 Sheets-Sheet 7
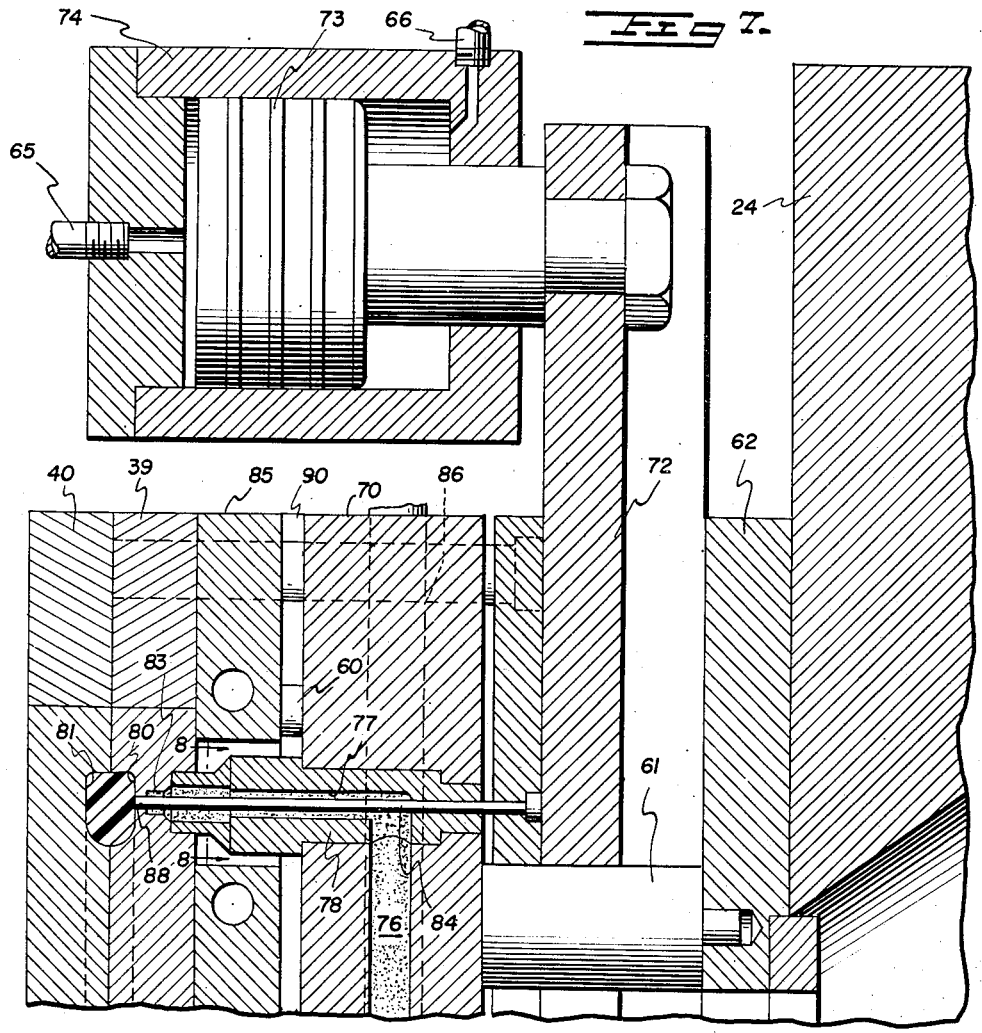
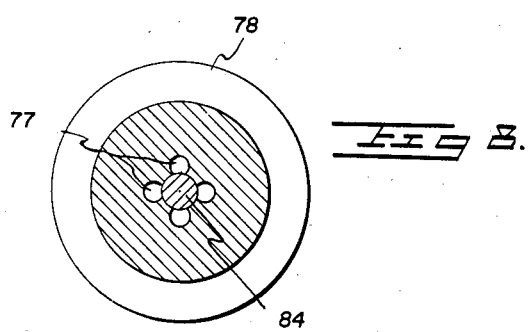
INVENTOR
WILLIAM STRAUSS.
BY Adams, Forward & McLean
ATTORNEYS

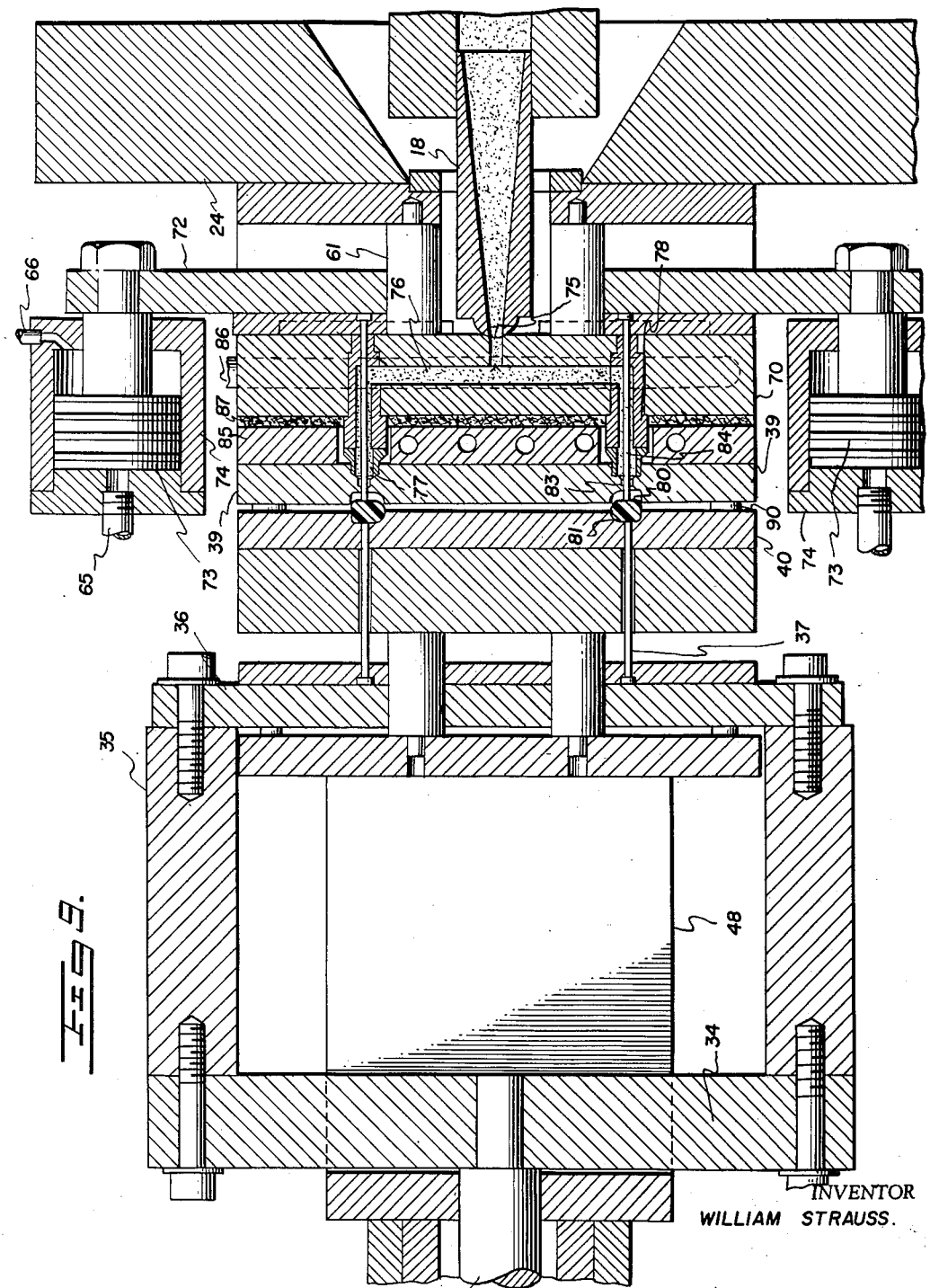

2,828,507

INJECTION MOLDING PRESS HAVING VALVED GATE

William Strauss, Philadelphia, Pa., assignor to F. J. Stokes Corporation, Philadelphia, Pa., a corporation of Pennsylvania Application December 7, 1953, Serial No. 396,660

3 Claims. (Cl. 18—30)

My invention relates to molding plastic materials, and in particular my invention provides a machine for injection molding of thermoplastics.

Present day commercial techniques of injection molding generally require high pressure injections of thermoplastic material in a fluidized (heated) condition from a single injection nozzle into a die cavity or cavities formed in a mold which is separated into two or more parts for the purpose of removing solidified, molded articles. Such techniques usually require a sprue channel be formed in the mold to provide fluid communication between the die cavity and the orifice of the injection nozzle. When a number of articles are to be separately molded in a single operation or when an article having a large volume is to be molded in a single mold it has been found necessary to provide several gates from the sprue channel into the die cavity or cavities. The gates are connected to the sprue channel by runner channels. Where the charge injected into a mold has been solidified by cooling in the conventional manner a single piece, including not only the molded article or articles but also sprues and runners, is removed from the mold.

It has been proposed to eliminate the necessity of degating injection molded pieces from the solidified sprues and runners by obviating the formation of such solidified sprues and runners. This is accomplished by maintaining a heated chamber, interposed between the injection device and mold, which is filled with molten thermoplastic and through which each periodic injection of thermoplastic must pass. In each cycle of operation composed of injection, solidification and ejection operations in sequence, communication between the heated chamber and mold is commenced just before injection begins and terminates just prior to the end of the injection operation and requires the employment of a valve for the gate leading into the die cavity, i. e. mold interior, which can be operated independently of the injection device, although in timed relation with the latter.

It is a particular object of my invention to provide such a valve for the gate of an injection molding press which can slide into a flush fit with the interior surface of the mold and thus completely obviate the occurrence of any disfigurement of the molded article thereby leaving no more evidence of the presence of an injection gate than is left by smoothly aligned knock-out pins. In making some molded pieces, of course, an indentation or protrusion on the pieces at the injection gates is not objectionable. In such cases flush fit of the valve with the interior surface of the mold is not essential to my invention. I also contemplate deliberately avoiding a flush fit where an indentation or protrusion at the gate is a necessary part of the configuration of the molded pieces.

More specifically I contemplate providing a gate valving arrangement for such an injection mold press in which the valve not only is employed to seal the heated chamber from the mold interior but which during ejection functions can also be employed as a knock-out pin following the motion of the parting mold to eject the molded piece or pieces from the mold.

Further and more specific objects of this invention and a better understanding of its practical application will become apparent from a consideration of the following description when taken in conjunction with the accompanying drawings wherein:

Fig. 1 is a side elevation view of my improved molding machine;

Fig. 2 is a plan view of my machine;

Fig. 3 (subdivided into Figs. 3a and 3b by line 3—3) is an enlarged vertical longitudinal partially sectioned view of my machine as viewed in Fig. 1 particularly showing the plastic heating and injection means and the molding device wherein the mold is in an open position as shown in Fig. 1 with the ejection pins fully extended;

Fig. 4 is a view taken on line 4—4 of Fig. 2 rotated to the upright position;

Fig. 5 is a view taken on line 5—5 of Fig. 2 and rotated to upright position;

Fig. 6 is an enlarged vertical longitudinal mid-section view of the machine as viewed in Fig. 1 showing the principal molding parts and injection nozzle wherein the molding plates are in a closed position and thermoplastic material is being injected into the die cavities;

Fig. 7 is an enlarged fragmentary view of the portion of the press shown in Fig. 6 taken after completion of the injection stroke but prior to opening of the mold;

Fig. 8 is a cross-sectional view taken at line 8—8 in Fig. 7 showing the internal structure of the bushing connecting the mold particularly illustrating the passage of the sealing pin through such bushing; and Fig. 9 is a view similar to that of Fig. 6 showing the mold as it begins to part.

Referring now to Figs. 1–3, it will be seen that my machine has a base 20 on which is rigidly mounted an abutment 21 from which extends a lower tie rod 22 and an upper tie rod 23, the opposite ends of these tie rods being anchored to a fixed platen 24 rigidly mounted on the base 20. A movable platen 25 is slidably mounted on the tie rods 22 and 23 and is rigidly fixed to the main power ram 26 through the horizontally spaced side arms 48. Cooperating dies 39 and 40 are appropriately removably secured to the opposing faces of the fixed platen 24 and the movable platen 25, respectively.

As seen more clearly in Fig. 3a, the hydraulic power unit includes main power ram 26 which has a piston 27 at its outer end positioned in a main cylinder 28. By appropriate regulation of hydraulic pressure through supply conduits 29 and 30 the movable platen 25 is caused to reciprocate horizontally to open or close cooperating dies 39 and 40.

The inner end of main power ram 26 has an opening therein which forms an ejector cylinder 31 for housing the objector piston 32 of an ejector mechanism. This ejector mechanism provides for the ejection of molded parts from the movable die irrespective of the position of the main power ram through an ejector piston rod 33 rigidly connected to an ejector plate 34 which is in turn connected to bars 35. Rigidly affixed to bars 35 is an ejector pin plate 36 on which are mounted a plurality of ejector pins 37 which pass through appropriate passages in the movable die 40. Suitable hydraulic lines 41 and 42 are provided for powering the ejector mechanism.

Housed within the base 20 is an appropriate hydraulic pump (not shown) for applying a predetermined relatively low pressure through conduit 30 to cylinder 28 until dies 39 and 40 reach a partially closed position at which time a hydraulic booster pump (not shown) applies a relatively high pressure to move the dies from the partially closed position to a fully closed position for injection of the molding material. By this arrangement the complete closing of the die members is avoided if material is present between the mating faces of the die members.

The injection mechanism for feeding fluent molding material to the mold, shown enlarged in Fig. 3b, is connected to the fixed platen 24 in fluid communication with the fixed die member 39 and has a hopper 10 from which material flows in measured quantities past a feed piston 11 into a feed cylinder 12. The material is then drawn back and dropped into heating cylinder 13 and fed inwardly by an injection plunger 14 into the mold. The injection plunger 14 is hydraulically operated through the injector hydraulic means 15, which includes a piston 43 of which plunger 14 is an extension, a cylinder 44 enclosing piston 43 and hydraulic fluid supply conduits 46 and 47. Suitable heating means (not shown), such as an electrical or hot oil heating mantle is preferably mounted around the heating chamber 16 to accomplish the heating necessary to fluidize the molding material, and a spreader 17 is positioned in the center of the plasticizing chamber to insure uniformity of heating. Enough material for several molding cycles is present in the heating cylinder 13 at any given time and the newly introduced material becomes increasingly plasticized as it approaches the injection nozzle 18 under the injection and stuffing action of the injection plunger 14.

A stripper mechanism 50 is mounted on an upper slide rail 51 and a lower slide rail 52 for adjustable movement along the longitudinal axis of the machine. The stripper mechanism 50 has a housing 53 which encloses a stripper comb 45 which reciprocates into and out of the space between the die members when parted. Comb 45 is horizontally slotted to permit it to straddle ejector pins 37 while it is in the space between dies 39 and 40. Insertion of comb 45 is timed to occur after pins 37 have been extended to push molded pieces from the die cavity. Retraction of the pins then follows, thus permitting comb 45 to strip from pins 37 any particles or finished pieces which might not have fallen clear. A hydraulically powered cylinder 56, mounted on the housing 53, reciprocates stripper comb carriage 57 by means of piston rod 58 and the angle connector 59. The carriage 57 is guided in its movements by an adjustable upper guide and a lower track.

Fixed die plate 39 (see particularly Figs. 4-9) is attached to fixed platen 24 through an interposed chambered plate 70 to which it is bolted by pins 60. Plate 70 is mounted by supporting pillars 61 which secure it to a plate 62 bolted to platen 24. Plate 70 is spaced by pins 60 from die plate 39 and is spaced by pins 61 from plate 62. A yoke 72 is horizontally reciprocated between plate 70 and plate 62 by a pair of double acting hydraulic pistons 73 enclosed in cylinders 74 mounted to plate 62 above and below chambered plate 70, by cross-arms 63 and supports 64. A pair of conduits 65 and 66 supply hydraulic fluid to power each cylinder 74.

Injection nozzle 18 extends through apertures in fixed platen 24 and plate 62 and abuts in fixed position against an aperture 75 in chambered plate 70. Aperture 75 leads into central chamber 76 of plate 70 and corresponds in function to the sprue channel of conventional injection molding machines. Chamber 76 similarly corresponds in function to the runner channels of conventional injection molding machines. Bushings 78 having converging channels 77 therein project from plate 70 to the fixed die member 39. By converging channels I refer to the fact that channels 77 are tapered or otherwise brought to a smaller cross-section as they project from plate 70. The channels need not actually converge within bushings 78, but, as shown in the drawings, can lead to an aligned opening in another member, i. e. die plate 39, having a more restricted cross-section.

Fixed die plate 39 contains a number of die surfaces 80 which with complementary die surfaces 81 in movable die plate 40 define die cavities having the requisite shape of the articles which it is desired to mold. Die surfaces 80 are each connected to a corresponding bushing 78 leading from chambered plate 70 to permit the injected plasticized material to pass into the die cavity defined by such die surfaces with complementary surfaces 81. Thus a small aperture 83 is cut through die plate 39 leading to each die surface 80. Each bushing 78 fits tightly and securely into the reverse side of such apertures 83 thus providing a communicating passage to each die cavity 80—81 from nozzle 18 through aperture 75, chamber 76 and channels 77.

Bushings 78 project sufficiently from plate 70, so that a substantial open space exists between plate 70 and die plate 39, more than sufficient to accommodate cooling plate 85 attached to die plate 39. This space insulates plate 70 from cooling plate 85 and die plate 39. Electrical resistance heating elements 86 are located in plate 70 to maintain it at a high temperature sufficiently above the solidification temperature of the thermoplastic being handled to insure retaining the thermoplastic in chamber 76 in a fluid, injectable condition.

I have found it particularly advisable to insure proper insulation between heated chambered plate 70 and cooled die plate 39. An air space such as has been described above will afford such shielding. It is, however, advisable in most cases to provide additional insulation such as asbestos sheet 87 (for clarity of other details, shown only in Fig. 9) between plate 85 and plate 70 and at the same time to reduce to a minimum the direct metal-to-metal contact between such plates. In the press illustrated die plate 39 and its associated cooling plate 85 are rigidly attached to chambered plate 70 with a minimum of metal-to-metal contact by small diameter pins 60. Bushings 78 also permit only limited area of contact between plates 39 and 70 and project considerably from plate 70 before they contact plate 39 and thus increasing the path which heat must travel in order to escape from plate 70 to plate 39. The reason for such insulation between the plates is that at all times they are rigidly secured to each other as indicated above during injection, solidification and ejection operations and hence no significant cooling of plate 70 or heating of plate 39 due to their relative proximity can be tolerated.

A second cooling plate 79 advantageously is affixed to the rear face of moving die plate 40 in a manner similar to that in which cooling plate 85 is affixed to fixed die plate 39. Both cooling plates are connected to a liquid coolant circulator (not shown) by conduits 82.

Attached to yoke 72 are sealing pins 84 which pass centrally through channels 77 in bushings 78. Pins 84 are reciprocable in a horizontal manner through plate 70 and can extend centrally through openings 83 in die plate 39 into each die cavity 80—81. The tip 88 of each pin 84 can be retracted by reciprocation of yoke 72 a sufficient distance up channel 77 within bushing 78 to permit thermoplastic material to by-pass pin 84 and enter the die cavity defined by surfaces 80 and 81. Each pin 84 can also be extended by reciprocation of yoke 72 sufficiently into aperture 83 to seal the passage 77 from chamber 76 into the die cavity through bushing 78. Each pin 84 can be positioned to aperture 83 so that each tip 88 fits flushly with the internal die surface 80 leaving no noticeable depression or protrudance in such surface. In the illustrated case each pin 84 can also be reciprocated under the influence of yoke 72 to a position at which tip 88 extends beyond surface 80 into the die space defined by surfaces 80 and 81. Limit pins 90 mounted on yoke 72 extend horizontally through plate 70 and die plate 39 at a point in the face of die plate 39 where there are no die surfaces 80. Each pin has a length such that when the press is closed, i. e. die plates 39 and 40 abut each other, pins 90 limit the movement of yoke 72 in a direction away from the injection mechanism to position pins 84 with their tips 88 flush with the internal surface 80.

Suitable contacting, making and breaking devices are arranged at various parts of the machine to operate relays for the control of suitable time-controlled valves providing a proper sequence of operation of the various parts of the press with the proper timing. The electrical control system employed in the horizontal injection molding press described in my copending application Serial No. 254,226, now United States Patent No. 2,739,349, and particularly shown in Fig. 10 of that application, is suitable for the control of the previously described press with only a minor adaptation to include the additional control of sealing pins 84 required by the present invention.

This additional control is suitably accomplished by connecting conduits 65 and 66 which control the position of pistons 73 in cylinder 74 to the same source of hydraulic pressure as conduits 46 and 47, respectively, which supply the hydraulic fluid to power injection piston 43 within injection cylinder 44 and thus operate injection plunger 14. Proper operation requires that sealing pins 84 open apertures 83 just prior to the injection stroke of plunger 14 and that sealing pins 84 close apertures 83 just prior to retraction of injection plunger 14. With conduits 65 and 66 connected to a source of hydraulic power common to conduits 46 and 47, delay valves interposed in the conduits 46 and 47 leading to the injection hydraulic means 15 will provide the desired operation.

Any suitable control mechanism, however, can be utilized and should be designed for the given machine. Such design forms no part of the present invention and will be obvious upon the following description of the operation of the various parts of the present machine.

Referring to Figs. 1 and 2 which show my injection molding machine with dies 39 and 40 parted, ejector pins 37 are extended from the face of die plate 40 and comb 45 is straddling ejector pins 37. In the fixed press member sealing pins 84 and limit pins 90 are extended through the face of die plate 39. The extension of pins 84 through die surfaces 80 thus prevents the possibility that any molded articles will remain within the die surfaces 80. Referring particularly to Fig. 3b, it will be seen that chamber 76 and apertures 75 are sealed by pins 84 from communication with die surfaces 80, and are filled with plasticized thermoplastic material retained at a sufficiently high temperature to insure a viscosity suitable for injection. It will also be noted that injection plunger 14 is withdrawn and feed piston 11 blocks passage from hopper 10 into feed chamber 12.

Pins 37 are then retracted within die plate 40 by reversing the hydraulic fluid connections to conduits 41 and 42 to drive piston 32 to the left within cylinder 31. This retraction of pins 37 insures that any molded pieces remaining on pins 37 are stripped therefrom by stripper comb 45 which is astraddle pins 37. The molded pieces thus removed fall vertically into a hopper (not shown) beneath the space between open die plates 39 and 40. By suitable actuation piston 58 within cylinder 56 is retracted to remove stripper comb 45 from its position between the parted dies.

Main power ram 26 is then operated by hydraulic pressure supplied to conduit 30 and slides platen 25 in a direction closing die plates 39 and 40. This movement as described in my aforenoted copending application may be provided with a safety device whereby only a relatively low pressure is applied to conduit 30 until dies 39 and 40 reach a partially closed position after which a booster pump applies high pressure to close the dies fully to proper position for injection of molding material. The closed position is similar to that shown in Fig. 7 except the die cavity defined by die surfaces 80—81 is empty. The complete closing of die plates 39 and 40 moves limit pins 90 to a slightly retracted position causing yoke 72 to reciprocate a short distance toward the injection means and retract pins 84 to a position at which the tip 88 of each pin 84 lies flush with each die surface 80.

When the press is completely closed hydraulic pressure is applied to conduit 65 forcing piston 73 to reciprocate yoke 72 to its maximum extension from plate 70. A suitable actuation system to control pressure to conduits 65, which detects the presence of any molded pieces which might remain between die plates 39 and 40, is the double shot detection system disclosed and claimed in my copending application Serial No. 370,140, filed July 24, 1953, and now abandoned. Any suitable method for detecting the closure of plates 39 and 40 can be used, however, to actuate the hydraulic supply to conduits 65. The movement of yoke 72 toward the injection means withdraws pins 84 from apertures 83 to a position within channel 77 which opens communication between channel 77 and the die cavity between each pair of die surfaces 80 and 81.

When pins 84 have been so retracted hydraulic pressure is connected to move injection plunger piston 43 in a direction forcing some of the thermoplastic material contained within heating chamber 16 (see Fig. 3b) through nozzle 18 into chamber 76 within plate 70. At the same time feed piston 11 is moved to a position which permits some additional thermoplastic material to pass from hopper 10 into feed cylinder 12. The forcing of new thermoplastic into chamber 76 forces some of the plasticized material retained in chamber 76 outwardly through channel 77 to fill die cavities 80—81. The continuous circulation of coolant in plates 79 and 85 cools the material within die cavities 80—81 to a temperature at which it is solid (see particularly Fig. 6).

While injection plunger 14 is still maintaining pressure on the injected charge the hydraulic connections to conduits 65 and 66 are reversed forcing pistons 73 to the left and thus reciprocating yoke 72 toward the dies extending pins 90 through die plate 39 and pins 84 outwardly through channel 77 into aperture 83 of die plate 39. As pins 90 meet the opposing face of die plate 40 (see Fig. 7) the reciprocation of yoke 72 is limited and the extension of pins 84 is stopped with their tips 88 flush with die surfaces 80. This position of pins 84 seals the die cavity 80—81 from communication with channel 77.

Following the extension of pins 84 into apertures 83 the hydraulic pressure to conduits 46 and 47 is reversed to retract plunger 14 from chamber 16 and also to pull feed piston 11 through feed cylinder 12 delivering a charge of powdered thermoplastic material into heating cylinder 13 to prepare it for further injection.

When the material contained within dies 80—81 has remained there for a sufficient length of time to effect substantial cooling to solidification temperatures the hydraulic pressure connections to conduits 29 and 30 are reversed thus retracting main power ram 26 and parting die plates 39 and 40.

As the plates begin to part (see Fig. 9) limit pins 90 follow moving plate 40 under the positive hydraulic pressure applied to piston 73 by conduit 66 thus causing yoke 72 to complete its reciprocation to a position abutting chamber 70 and extending sealing pins 84 outwardly through the faces of die surfaces 80 at the same rate as the withdrawal of plate 40 from plate 39 thus effectively knocking out the molded pieces from die surfaces 80. Additional knock-out pins can be employed affixed to yoke 72 and passing through die plate 39 which do not serve the function of sealing pins 84, namely that of closing apertures 83. It is also possible to utilize separate knock-out pins for plate 39 and not to provide pins 84 with the knock-out feature just described.

When plates 39 and 40 are completely parted hydraulic pressure to conduits 41 and 42 powering ejection piston 32 within cylinder 31 is reversed causing piston 32 to extend pins 37 outwardly through die surfaces 81 in die plates 40 thus ejecting the molded pieces from die surfaces 81. These pieces fall downwardly to a hopper (not shown) contained within base 20 or through a chute delivering the molded pieces to a hopper.

While pins 37 are extended piston 58 is extended outwardly from cylinder 56 to operate stripper comb carriage 57 inserting stripper comb 45 into the space between die plates 39 and 40 straddling pins 37. Thereafter the operation is cyclically repeated as described before.

I claim:

1. In an injection molding press including a mold, a die cavity within said mold, means for parting said mold to expose said die cavity, cooling means for said mold, injection means including a nozzle for injecting a charge of fluent molding material into said die cavity, means defining a chamber, heating means for said chamber, an aperture in said chamber to which said nozzle is connected and a channel communicating said chamber and said die cavity, the improvement which comprises a pin independent of said injection means slidably extensible through said channel between a first position in which the tip of said pin is withdrawn in said channel to permit molding material to pass through said channel, a second position in which said pin seals said channel with the tip of said pin forming a portion of the die surface of said die cavity and a third position in which said pin seals said channel with the tip of said pin projecting into said die cavity, and means operable in timed relation with said injection means while said mold is closed to extend said pin through said channel between said first and second positions and operable in timed relation with said means for parting said mold to extend said pin between said second and third positions whereby said pin operates while the mold is closed to permit molding material to pass into said mold and operates when said mold parts to seal said channel and to eject a molded part from said die cavity.

2. In an injection molding press including a mold, a die cavity within said mold, means for parting said mold to expose said die cavity, injection means for injecting a charge of fluent molding material into said die cavity, and means defining a channel communicating said injection means and said die cavity; the improvement which comprises a pin slidably extensible through said channel between a first position in which the tip of said pin is withdrawn in said channel to permit molding material to pass through said channel, a second position in which said pin seals said channel with the tip of said pin forming a portion of the die surface of said die cavity and a third position in which said pin seals said channel with the tip of said pin projecting into said die cavity, and means operable in timed relation with said injection means while said mold is closed to extend said pin through said channel between said first and second positions and operable in timed relation with said means for parting said mold to extend said pin between said second and third positions whereby said pin operates while the mold is closed to permit molding material to pass into said mold and operates when said mold parts to seal said channel and to eject a molded part from said die cavity.

3. In an injection molding press including a mold having a fixed plate and a second plate movable relative thereto from a position abutting said fixed plate, said plates in abutting position defining a die cavity between them, means for moving said second plate to part said mold and expose said die cavity, injection means for injecting a charge of fluent molding material into said die cavity, and means defining a channel in said first named plate communicating said injection means and said die cavity; the improvement which comprises a pin slidably extensible through said channel between a first position in which the tip of said pin is withdrawn in said channel to permit molding material to pass through said channel, a second position in which said pin seals said channel with the tip of said pin forming a portion of the die surface of said die cavity and a third position in which said pin seals said channel with the tip of said pin projecting into said die cavity, means defining a bore in said first plate offset from said die cavity and opening against the abutting face of said second plate, a second pin slidably extensible in said bore, a yoke mounted for reciprocation aligned with the sliding movement of said first and second said pins, said first and second pins being fixed at their ends remote from said movable die plate to said yoke with said second pin abutting said movable die plate at said second position of said first pin when said pair of die plates are in abutting position, and means operable in timed relation with said injection means when said pair of plates are in abutting position and said mold is closed to reciprocate said yoke to extend said first pin through said channel between said first and second positions thereby extending said second pin into a position abutting said second die plate and said last named means being operable in timed relation with said means for moving said second plate to reciprocate said yoke holding said second pin in abutting contact with said movable die plate as said mold is parted to extend said first pin between said second and third positions, whereby said first pin operates while the mold is closed to permit molding material to pass into said mold and operates when said mold parts to seal said channel and to eject a molded part from said die cavity.

References Cited in the file of this patent

UNITED STATES PATENTS

| | | |
|---|---|---|
| 1,983,602 | Daubenmeyer | Dec. 11, 1934 |
| 2,227,263 | Knowles | Dec. 31, 1940 |
| 2,254,233 | Meyer | Sept. 2, 1941 |
| 2,770,011 | Kelly | Nov. 13, 1956 |